UNITED STATES PATENT OFFICE.

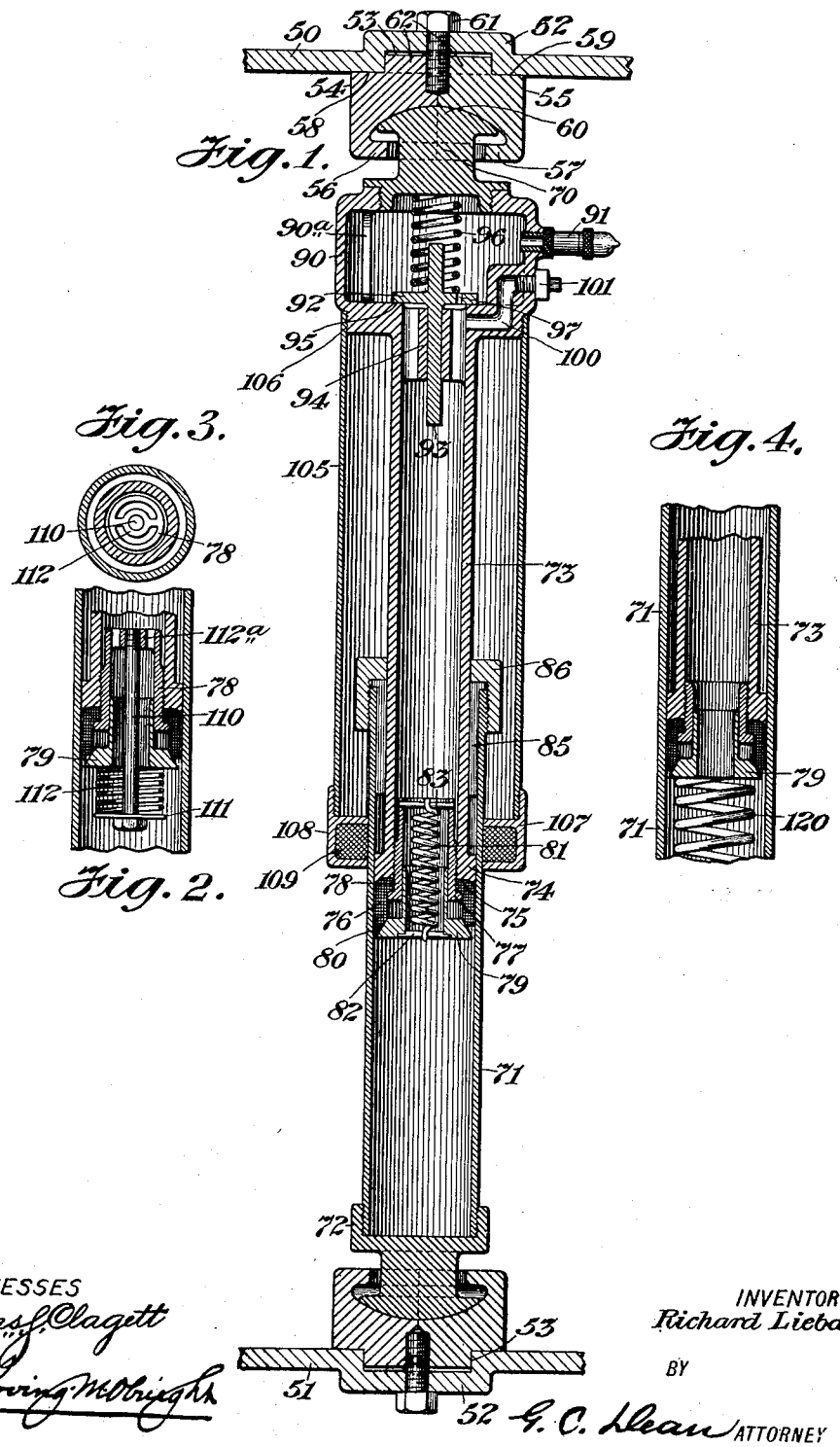

RICHARD LIEBAU, OF WATERVLIET, NEW YORK, ASSIGNOR TO THE WESTINGHOUSE AIR SPRING COMPANY, A CORPORATION OF PENNSYLVANIA.

VEHICLE AND ELASTIC SUSPENSION DEVICE THEREFOR.

1,111,754.        Specification of Letters Patent.     Patented Sept. 29, 1914.

Application filed December 22, 1908. Serial No. 468,762.

*To all whom it may concern:*

Be it known that I, RICHARD LIEBAU, a citizen of the United States, and a resident of Watervliet, in the county of Albany and State of New York, have invented certain new and useful Improvements Relating to Vehicles and Elastic Suspension Devices Therefor, of which the following is a specification.

My present invention includes means whereby the load bearing platform of a vehicle may be elastically supported on its running gear, though many of the features are broadly applicable in any other relation where two bodies are so associated that resilient relative movement is desirable, and especially where one or the other of the bodies is subject to sudden movements, vibrations, or shocks, which it is undesirable to have transmitted to the other of said bodies.

Though capable of use in other relations, the invention has been devised primarily in connection with automobiles, and the general object in view has been to embody the principles of resilient support by an elastic compression medium, such as air or gas, in a practical, self-contained, gas-tight compression device adapted to serve all of the purposes of the steel springs commonly employed, and to combine therewith all of the desirable features of a shock absorber, the entire device being adapted to meet the exacting conditions and stand the rough usage required in connection with automobiles, delivery wagons, trucks, railway rolling stock, etc. To this end the air compression member is preferably so constructed and so combined with the vehicle body and running gear, that it acts solely as a compression member, the traction and other fore and aft stresses and also the lateral stresses being sustained by comparatively rigid supplemental guiding members.

The elastic compression device is preferably constructed so as to operate on an unchanging body of initially supplied compressed air, thus rendering unnecessary any permanent connection with compressed air reservoirs, pumps, or other auxiliary pressure maintaining means. To this end, my invention includes various features whereby the packing of the movable parts, as well as the joints and metal walls of the container, are free from leakage, so that the device will operate satisfactorily day in and day out without special care, and, in practice, requires no attention other than the usual annual or seasonal overhaulings required for such vehicles.

It has been my purpose to make the elastic compression device as short as practicable, for a given vertical play or elastic throw, and at the same time to keep its diameter small. For ready application to existing types of automobiles, without reorganization of the construction, the diameter of the compression device ought not to be much greater than the width of the leaf springs commonly employed in such constructions.

In order to get the required elastic throw, compression space, and clearance in a small space, I prefer to make the compression members in the form of telescoping tubes, with the smaller or piston tube uppermost, and terminating at the top in a compression chamber of greater diameter, preferably of a diameter equal to or greater than the maximum over all diameter found at any other portion of the length of the device. A suitable controller for the flow of fluid to and from the compression chamber is arranged near the upper end of the piston cylinder. The entire length of the device is thus made available as a container for the compression fluids.

A sufficient quantity of liquid is charged into the device, to bring the liquid up to or just above the level of the piston packing. The compression chamber is proportioned with respect to the total effective compression space and to the amount of liquid, so that the ratio of extreme compression is not much greater than 2 to 1 or 3 to 1, though for special purposes the amount of liquid may be increased to increase the maximum ratio of compression. I prefer, however, to adjust the supporting power of the compression device by increasing or diminishing the initial internal pressure of the air or other gas supplied thereto and to keep the ratio of compression about that described.

The device for controlling the flow of the compressible medium between the variable cylinder space and the fixed volume compression chamber, is preferably a valve permitting relatively free flow into the chamber and automatically throttling the reverse flow to a desired extent. As disclosed herein, the said valve has some throttling effect upon the flow into the compression chamber so as to slightly dampen or modify the possible velocity of compression of the device, but the throttling of outflow from the compression chamber is made very much greater for the purpose of very materially retarding the resilient upward throw of the piston after extreme compression. In all cases, I prefer to have the proportions such that the asymmetric valve for controlling the fluid flow will operate upon the compressible part of the fluid medium and in actual operation will not be reached by an incompressible body of the liquid.

For my purposes, I prefer to have the primary packing at the sliding joint normally submerged in a freely bathing body of liquid and to have the valve above that level. Hence, I prefer to arrange the larger compression cylinder as the lowermost member and to arrange the packing upon the lower end of the piston cylinder sliding therein. The enlarged compression chamber is arranged at the uppper end of the piston cylinder, so that the foam of the liquid, which may work into said chamber in operation of the device, will drain back into the main body of the liquid in the cylinder space.

The sliding joint between the cylinders may be made air tight by making the packing in the form of a knife edge of elastic metal expanded into contact with the cylinder by the internal pressure, after the manner set forth in my prior applications Serial Nos. 411,893 and 411,894. Such a joint will hold indefinitely without leaking, provided the cylinder be made perfectly true circumferentially and of perfectly uniform diameter from end to end, and, provided the knife edge and sliding contact surface on the piston be ground to fit perfectly. While I may use this form of piston packing, I prefer to use a soft flexible cup packing, having its free edge maintained in contact with the walls of the cylinder by a rigid, resiliently forced, expanding device. Such a packing conforms perfectly to minor irregularities of contour and diameter of the cylinder, and hence neither the cylinder nor the piston need be finished with great accuracy, by which I mean that accuracy of the order of a thousandth of an inch or less is sufficient. As a cup packing sufficiently soft and flexible and at the same time sufficiently durable for my purposes, I prefer a pressed leather cup. This material is notoriously too porous to perfectly hold high pressure for long periods, but I have discovered that graphite, if sufficiently finely divided and suspended in the liquid within the cylinder, will be forced into the fiber of the leather, thereby completely and perfectly plugging all the pores thereof.

The liquid in which the graphite is suspended should be sufficiently fluid for proper flow and drainage in cold weather, and is selected with reference to the material of the packing with a view to keeping the material soft and flexible. Internal-frictional resistance of the liquid is unobjectionable, insomuch as it merely affords a substitute for part of the dash-pot retardation which is always provided for in the device, and frictional wear is small in any event, because by my invention the device is relieved of all side thrust. Frictional heat, however, must be avoided, as the leather hardens and crumbles under a very moderate heat, even when amply supplied with moistening fluid. Various liquids, such as glycerin, oil, etc., will answer the purpose, however, especially where a freely bathing body thereof is continuously maintained in contact with the leather, though I prefer a non-volatile, non-drying mineral oil, not easily oxidizable when in contact with air. My experience is that where a liquid is used in bathing contact with leather or fiber indurated or vulcanized by means of any of the known chemical fillers, the liquid under enormous pressure will ultimately displace or chemically change the filler or the material of the packing, so that it becomes porous and that only a mechanical filler, such as very finely ground graphite, talc, or similar material, suspended in the bath liquid, so as to be continually forced into the material by the internal pressure, can be relied on to maintain practically perfect the texture and the tightness of the material of the packing. The bathing liquid must be continuously copiously supplied to the packing in connection with any such mechanical filler, and this is best accomplished from an internal supply. Another advantage of the finely powdered filler, such as graphite, with a liquid, such as mineral oil, is that the liquid carries the graphite throughout the entire interior of the device, so that the filler is mechanically driven by the great pressure into the pores or leaks in the material of the metal walls and into all joints of the device, as well as into the packing. For these reasons, I prefer soft, flexible packing, such as leather, submerged in a liquid, such as oil, to increase and maintain its flexibility, together with a mechanical filler, such as finely pulverized graphite, to fill the pores. Both the oil and the graphite serve to lubricate the device sufficiently to prevent excessive wear of the leather or leakage between the leather and the cylinder wall by maintaining a sealing film of oil and graphite therebetween.

Though the incompressible liquid medium within my compression cylinder is preferably not water, and though the compressible gaseous medium need not be air, the device may be roughly and perhaps not inaccurately designated a hydro-pneumatic spring.

In the drawings: Figure 1 is a detail vertical sectional view showing the internal construction and means of attaching the cushioning device to an automobile; Fig. 2 is a fragmental sectional view corresponding to Fig. 1 and showing a modified detail of piston packing and expander; Fig. 3 is a transverse sectional view of Fig. 2; and Fig. 4 is a fragmental sectional view corresponding to Fig. 1, showing a modified form of the piston packing and expander.

The compression device comprises a lower cylinder 71 closed by cap 72, provided with the spherical bearing. The other member comprises a smaller cylinder 73 telescoping within and forming a hollow piston for cylinder 71. At the lower end of the cylinder 73 is formed a cylindrical enlargement 74, which accurately fits the walls of cylinder 71 and to that extent corresponds to a piston head. The lower end of said enlargement 74 is formed so as to afford a curved seat 75 for a cup-washer 76, which is clamped against said seat by an annular lip 77 of a bushing 78, screw threaded within the cylinder 73. As explained above, the cup washer is preferably of compressed leather. The free edge of this washer should be cut very smooth and is preferably beveled just enough to form a fair seat for the expander. An important feature of my invention consists of an expander 79, beveled as at 80, engaging the washer near the free edge thereof and continuously forced into wedging relation with said edge by suitable means, such as a spring 81 secured at one end to a cross bar 82 on the expander 79 and at the other end to a cross bar 83, at the upper end of the bushing 78. In the upper end of the cylinder 71 is accurately fitted a split bushing 85, which affords a bearing surface for the outside of cylinder 73 and also an abutment for the piston head 74 to limit outward or expansive movement thereof. The bushing 85 is held in position by an annular cap 86, screwed over the end of cylinder 71.

The upper end of the cylinder 73 carries the enlarged compression chamber 90, which has an outside opening provided with a suitable closure 91. The latter is preferably constructed after the manner of approved types of air valves for automobile tires, so as to permit pumping up of the inner air pressure to any desired degree and to insure secure closure against leakage. At the top of the cylinder 73, between it and the compression chamber 90, is arranged a check valve 92, provided with a stem 93 guided in bearing 94 and held against seat 95 by means of spring 96. This valve is arranged so as to afford a certain definite amount of leakage in the reverse direction when the valve is closed, and for this purpose I prefer to form an opening 97 in the valve itself. In the side of the casting 90 is arranged a passage 100, closed by a plug 101, through which passage oil may be charged into the lower part of the device beneath the check valve 92.

An external cylinder 105 is screw threaded at 106 to casting 90 and extends down over the joint between cylinders 73 and 71. At the lower end of cylinder 105, is secured an annular collar 107, bearing upon cylinder 71. Collar 107 is formed with an annular chamber 108 loosely packed, preferably with fibrous material 109. This external cylinder 105 serves as a guard to prevent access of dust or mud to the outer wall of cylinder 73, where it might be carried by movement of said cylinder into the cylinder 71 and thus come in contact with the piston packing 76 and so produce wear or leakage. The packing 109 may be itself substantially air tight, so that the volume of air contained within 105 does not change, and if there is any leakage back and forth during operation of the device, 109 acts as a perfect filter to prevent access of anything but pure air within this space.

By enlarging the horizontal section of the compression chamber, the length of the device for a given compression space is decreased by thirty to fifty per cent. Making the larger cylinder 71 lowermost and filling the device with liquid to a point above the packing, affords a large body of cooling, lubricating liquid always in contact with the packing. The liquid is continuously churned about by the movable piston, thereby maintaining the graphite in suspension and circulation. The leather packing being always beneath the liquid, is thereby maintained soft and flexible. If by any chance the liquid should leak enough to fall below the normal position of the packing, this will do no harm while running, because the remaining liquid being churned into foam, will be increased in volume so as to rise in the piston cylinder 73. When not running and with a bad leak, the liquid might settle below the leather packing, and in such case, if the vehicle remained out of use for a considerable time, thereby drying the packing sufficiently to permit leak, the upper cylinder will settle to a point where the packing will again be bathed by the liquid.

The check valve for controlling the recoil of the spring is located well above the normal level of the liquid, and if at the start an incompressible body of the liquid does reach said valve, it will be churned into foam, thus acquiring the characteristics of a compressible medium. The foaming carries the graphite into all crevices of the device. The washer cannot leak so long as maintained flexible by the liquid and impervious by the combined liquid and graphite. An important factor in this result is the solid wedging expander resiliently maintained in wedging position so that it affords a solid backing for the free edge of the washer. The proportion of parts and the angle of beveling of the expander are determined with reference to the texture and resilience of the leather, so that the extreme free edge of the packing is always in tightest engagement with the walls of the cylinder, but as will be evident from the drawing, the angle of the cone surface of the expander is always sufficiently obtuse to permit the expander to be squeezed or wedged downwardly against the pressure of the spring whenever for any reason the peripheral of centripetal pressure on the outside of the free edge of the packing becomes sufficiently great. That is to say, the effective pitch of the cone is greater than the angle of friction of the specific engaging surfaces employed, under the specific conditions established therebetween. For example, if the expander has adjusted itself for a given internal diameter of the compression cylinder at one point in the stroke, and it happens that by reason of wear or imperfection of manufacture, the diameter of the cylinder is slightly less at some other point in the stroke, the tendency to increase of the peripheral or external pressure when such point of the stroke is approached, will wedge the expander downwardly thereby preventing undue squeezing of the free edge of the packing ring, with the result that the upward and outward pressure on the cylindrical portion of the packing ring is automatically maintained practically constant in direction and amount notwithstanding slight variations of internal diameter. A similar automatic adjustment or self-accommodation operates to maintain uniform pressure upon the packing notwithstanding the alternating effects of the sliding friction between the packing and the wall of the compression cylinder, during the alternate compression and expansion movements of the device. Upon the compression movement this friction tends to compress and shorten the cylindrical portion of the cup leather and to curl the free edge thereof outwardly into desirable intimacy of contact with the wall of the compression cylinder but upon the expansion movement the friction tends to stretch and lengthen the cylindrical portion of the cup leather and to cause the free edge to curl away from the cylinder wall. The latter action would tend to decrease the perfection of fit and intimacy of contact of the cylindrical portion of the cup leather, yet the constant upward pressure of the spring tends to maintain the relative position of the expander with respect to the cup leather during such expansion movement and thereby to oppose and prevent development of the above mentioned tendency to longitudinal stretching of the cylindrical portion of the cup leather and curling away of the free edge thereof, during the expansion movements of the device. Under each and all of these conditions of operation the action of the expander applied primarily at the edge of the cup leather takes effect more or less upwardly as well as outwardly so that the entire exterior surface of the cylindrical portion of the cup leather as well as the free edge thereof is maintained in most intimate sliding contact with the adjacent wall of the compression cylinder. The normally continuous high pressure of the confined air within the device contributes materially to maintaining the expanded condition and intimate contact of the uppermost portion of the cylindrical wall of the packing, at the points more remote from the direct action of the expander, but the latter contributes, in the manner above described, by reason of the upward or longitudinal component of its wedging action and also by reason of the solid yet self-adjusting radial backing which it affords at the free edge of the cup leather, thereby preventing any imperfection of engagement and any escape of air at the edge.

It will be evident to those skilled in the art that the herein described practical perfection of fit of the packing during the expansion movements is not necessary and does not exist in the case of air or water pumps, fluid motors, or other devices in which the supply of fluid is renewed from time to time, usually during the expansion stroke of the piston, and in which it is not necessary to maintain a normally continuous high pressure at all times, by preventing any and practically all escape of fluid during both the expansion and compression movements of the device.

The compression throw may become very considerable, but in such case the dash-pot action of the liquid flowing through the smaller cylinder 73 and the constrictions at either end thereof, becomes greater because of its increased velocity, and this serves to keep down excessive violence of a compression stroke. The expansion stroke or rebound is subject to a much greater retardation by reason of the closure of the check valve, which permits reverse flow of the compressed air from the compression chamber only through the hole in the valve and the leaks around the valve seat. By reason of this mode of operation, the wheels are forced into all slight depressions of the road without much movement of the load carrying platform, and projections of the road cause a slightly throttled but nearly free compression movement of the wheels toward the load carrying platform, the rebound of the latter from such compression being completely tempered and controlled by the check valve.

Figs. 2, 3, and 4 show modified means for resiliently forcing the expander into contact with the edge of the cup leather. In Figs. 2 and 3, a tension rod 110, provided with a flange 111 for compressing spring 112, against expander 79, is screw threaded into the bridge 112ª across the upper end of bushing 78. The forcing effect of the spring will vary according to the extent to which the rod 110 is screwed up. Fig. 4 shows another variation wherein a long spring 120 is employed having a thrust bearing upon the underside of the expander 79 at one end and upon the bottom of the cylinder 71 at the other end.

In the operation of my hydro-pneumatic compression device, the rigid backing afforded by the expander and the resilient forcing thereof by the spring, serve to maintain the free edge of the cup packing continuously in intimate contact with the walls of the cylinder. My experience with packing under the conditions found in my device is that if the joint is to be absolutely tight, the edge must not curl away from the walls of the cylinder in the least degree, and that the internal pressure can be relied upon to maintain such necessary condition of the extreme edge only by the exercise of exceptional precautions, as, for instance, in the case of the metallic cup of my prior applications, the construction and fit must be as accurate as possible. By the use of my expander designed to work on the elastic edge of the packing, much less accuracy is necessary.

I prefer to make the cylinder and the compression chamber of a dense, non-porous material, such as fine quality bronze, the cylinder being usually made from the best quality of seamless tubing and the compression chamber being of fine quality casting, preferably internally strengthened by vertical ribs, as at 90ª. The interior of the casting is carefully cleaned to free it from all traces of sand and detachable fragments of metal. It is then tinned internally to insure cleanliness and filling of pores and cavities in the metal. If not tinned, or if the tinning is imperfect, the graphite may usually be relied upon to close the pores after the device has been in use a short time. The tubes are preferably finished internally with fine emery paper working lengthwise to insure uniformity of diameter. The principle joints, such as closures at 70 and 72, are made tight by heating and dipping the parts in solder and screwing home while the solder is plastic. The liquid is carefully filtered to remove all solid impurities and the graphite is pure and ground to uniform extreme fineness. The bushing 85 which forms the principal metallic wear surface of the cylinders, is preferably made of cast iron or steel when the piston cylinder 73 is of bronze, or of bronze when said cylinder is of cast iron or steel. The internal pressure is preferably high, but for convenience in practical operation of an automobile, is preferably not higher than can be supplied by an efficient tire pump of the ordinary commercial type, that is to say, some where about 150 to 200 pounds per square inch. I find that my piston packing holds much better for such pressures than it does for pressures of 40 to 60 pounds per square inch.

With a lower cylinder 71, say two inches in diameter, the higher pressures will sustain a load of 500 or 600 pounds per cylinder and in operation the maximum pressure may rise to two or three times the initial pressure, so that the maximum total sustaining power of each cylinder may amount to 1000 to 2000 pounds steady pressure, and for instantaneous pressures, the dash-pot action may be relied upon to sustain considerable overload at all stages of compression.

It will be noted that with the proportion of parts shown in the drawing, the hollow piston has an effective area equal to the difference between the internal area of cylinder 71 and that of cylinder 73. In the arrangement shown, these areas are about as 3½ to 1, so that the amount of fluid displaced by downward movement of the hollow piston 73 per inch of compression stroke is equal to the volume of about 2½ inches of the length of cylinder 73. This volume is required to pass through the relative constricted opening through the expander 79, and is thus subject to a certain amount of modifying dash-pot action. This relation of displacement areas, volumes, and constriction of passages results in a most desirable tempering of movements at all stages of operation, including the relatively short throw oscillations caused by small inequalities of the road which are insufficient to bring the check valve into full and controlling operation.

When mineral oil is used as the liquid in conjunction with air as the compressible medium under such high pressure, there is at first some sort of molecular or chemical absorption of the air by the liquid, but it will be understood that any initial fall of pressure which may be noted in first operation of the device is due to this cause, and that such action will not persist after the first repumping.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from the spirit of my invention.

I claim:

1. A hydro-pneumatic supporting or cushioning device comprising telescopic members slidable one within the other and confining a body of gaseous fluid, and having a sliding joint provided between said members and comprising a cupped packing ring formed from a single piece of leather clamped to one of said members and arranged in extended sliding engagement with the cylindrical wall of the other member, with the free edge of the said cupped ring extending in the direction of the high gaseous pressure, and a cone expander coöperating with said gaseous pressure, being yieldingly forced at practically constant pressure against said free edge of said cupped ring uniformly and continuously throughout its entire circumference whereby the action of the cone is self-adjusting and substantially uniform both during the compression movement when the sliding friction between the packing and wall tends to compress and shorten the cup leather, and during the expansion movement when such friction tends to stretch and lengthen said cup leather and to curl the free edge thereof away from the cylindrical wall.

2. A hydro-pneumatic supporting or cushioning device comprising telescopic members slidable one within the other and confining a body of gaseous fluid, and having a sliding joint provided between said members and comprising a cupped packing ring formed from a single piece of leather clamped to one of the members and arranged in extended sliding engagement with the cylindrical wall of the other member, with the free edge of the said cupped ring extending in the direction of the high gaseous pressure, a solid rigid cone expander and yielding means forcing said cone into engagement with the free edge of said cup leather in a direction parallel with the axis of the device, said cone being yieldingly forced at practically constant pressure against said free edge of said packing uniformly and continuously throughout its entire circumference whereby the action of the cone is self-adjusting and substantially uniform both during the compression movement when the sliding friction between the packing and wall tends to compress and shorten the cup leather and during the expansion movement when such friction tends to stretch and lengthen said cup leather and to curl the free edge thereof away from the cylindrical wall.

3. A hydro-pneumatic supporting or cushioning device comprising telescopic members slidable one within the other and confining a body of gaseous fluid, and having a sliding joint provided between said members and comprising a packing-ring formed from a single piece of leather clamped to one of the members and arranged in extended sliding engagement with the cylindrical wall of the other member, with the free edge of the said cupped ring extending in the direction of the high gaseous pressure, and a cone expander yieldingly forced at practically constant pressure against said free edge of said cupped ring uniformly and continuously throughout its entire circumference whereby the action of the cone is self-adjusting and substantially uniform both during the compression movement when the sliding friction between the packing and wall tends to compress and shorten the cup leather, and during the expansion movement when such friction tends to stretch and lengthen said cup leather and to curl the free edge thereof away from the cylindrical wall, said cone expander having a wedging angle greater than the angle of friction of its surfaces of engagement with the leather packing.

4. A cushioning device comprising telescopic members slidable one within the other and confining a body of gaseous fluid, a packing for the sliding joint between said members, comprising a flexible cupped packing ring clamped to one of said members and arranged in extended sliding engagement with the cylindrical wall of the other member, and a cone expander yieldingly held against the free edge of the cupped ring, said cone expander having a wedging angle greater than the angle of friction of its surfaces of engagement with the leather packing.

Signed at New York city, in the county of New York and State of New York, this fourteenth day of December, A. D. 1908.

RICHARD LIEBAU.

Witnesses:
GEORGE C. DEAN,
IRVING M. OBRIEGHT.